April 14, 1953  A. BERTEA  2,634,752
MECHANICALLY OPERATED CHECK VALVE
Filed Dec. 2, 1949
2 SHEETS—SHEET 1
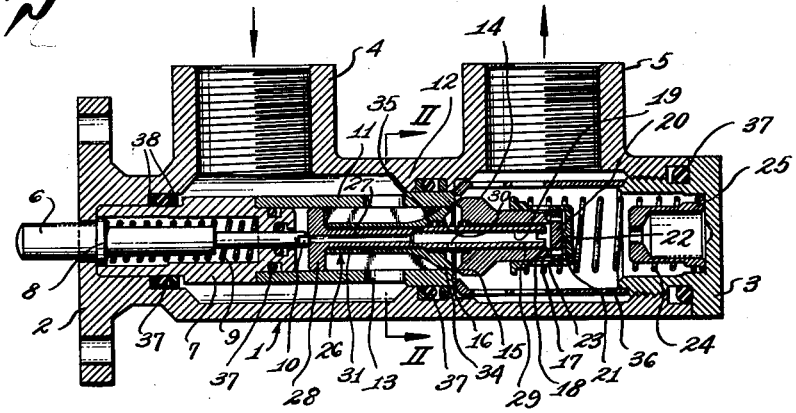
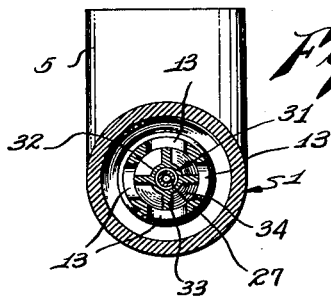
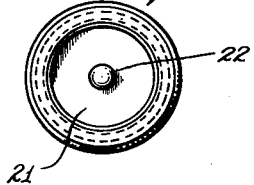
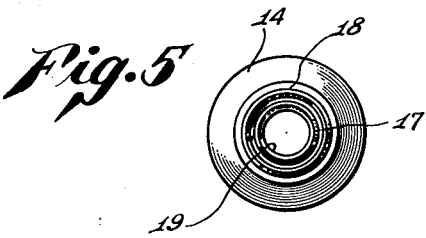
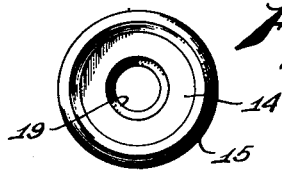
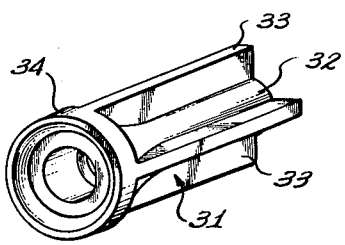
INVENTOR.
ALEX BERTEA deceased
BY H. DEXTER McKAY executor
Wm Edward Hann
Attorney April 14, 1953 A. BERTEA 2,634,752
MECHANICALLY OPERATED CHECK VALVE
Filed Dec. 2, 1949 2 SHEETS—SHEET 2

INVENTOR.
ALEX BERTEA deceased
BY H. Dexter McKay executor
Wm Edward Hann
Attorney Patented Apr. 14, 1953

2,634,752

UNITED STATES PATENT OFFICE 2,634,752

MECHANICALLY OPERATED CHECK VALVE

Alex Bertea, deceased, late of Pasadena, Calif., by H. Dexter McKay, executor, Puente, Calif.

Application December 2, 1949, Serial No. 130,693

7 Claims. (Cl. 137—630.13)

This invention relates to high pressure hydraulic valves and is particularly intended for incorporation in hydraulic systems having large tubing diameters and subject to very rapid and extreme variations in hydraulic pressure.

It is an object of the invention to provide a high pressure hydraulic valve which will have substantially no leakage even after extended periods of use, this feature being especially important in the case of hydraulic systems of airplanes used for long distance non-stop flights such as trans-ocean transport planes and long distance bombers.

Parts of the hydraulic systems of airplanes may be at times subjected to very heavy temporary loads and it is another object of the invention to provide a high pressure hydraulic valve structure which will withstand heavy temporary overloads without distortion or excessive wear of any of the parts.

The temperatures under which the hydraulic systems or parts thereof of airplanes must function efficiently vary very widely, and sub-zero conditions and also extreme heat may be experienced in a single flight, it is accordingly a further object of the invention to provide a valve structure which will function satisfactorily even under such extreme temperature variations.

High pressure hydraulic valves, normally mechanically controlled usually require the application of very considerable force to the operating parts, which is an obvious disadvantage in service requiring minimum weight and fast operation of the valve, a still further object of the invention is therefore to provide a high pressure valve which may be quickly operated by small forces.

In valves operated by a centrally located plunger it can easily happen that the force applied to the plunger is not applied axially of the plunger but off center, through some misalignment of the operating mechanism, such off center application of operating forces will cause serious wear in high pressure hydraulic valves with consequent leakage and possible failure of the valve, therefore another object of the invention is to provide a hydraulic valve structure which is not appreciably affected by the application of operating forces applied off center even to an amount not usually to be expected.

Still another object of the invention is to provide a hydraulic valve, particularly designed for high pressure systems, in which certain parts can function as a check valve, while the whole valve can be released against high back pressure by the operation of a stem projecting from the valve.

Another object of the invention is to provide a valve in which the various parts may be assembled and removed through an end cap, thereby facilitating the inspection and replacement of parts.

Other objects and advantages of the invention will be apparent from a study of the following specifications, read in connection with the accompanying drawings, wherein Fig. 1 is a central longitudinal section through a valve incorporating the features of the invention;

Fig. 2 is a cross section on the line II—II of Fig. 1;

Fig. 3 is an end view of a spring guide and retainer for an auxiliary pilot valve shown in Fig. 1, but drawn on a larger scale;

Fig. 4 is a perspective view of the auxiliary pilot valve which is normally contained within the spring guide and retainer shown in Fig. 3;

Fig. 5 is an end view of a poppet valve included in the valve structure, looking in the direction of the arrow 5 in Fig. 1, and drawn on a larger scale;

Fig. 6 is an end view of the poppet valve shown in Fig. 5 but as seen looking from the opposite direction;

Fig. 7 is a perspective view of a flow guiding member forming part of the main valve, as seen looking from the right in Fig. 1, but drawn on a larger scale;

Figure 8:
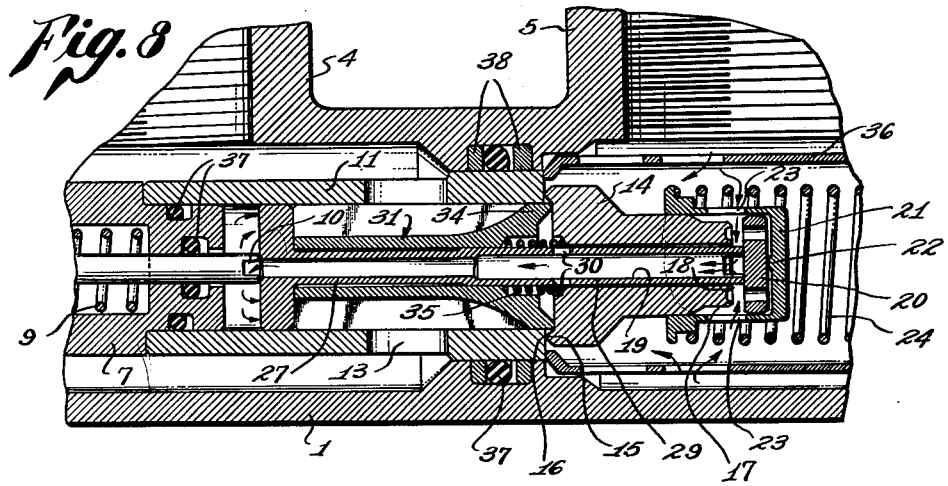
Fig. 8 is a fragmentary central vertical section of the valve drawn on a larger scale and showing the position of the valve parts at the commencement of an opening movement of the valve by an operating stem to release the valve against back pressure.

Referring to the drawings the numeral 1 in Fig. 1 indicates generally a tubular valve body having a mounting flange 2 at a closed end, and a removable cap 3 mounted in a threaded port at the opposite open end of the housing through which all the parts of the valve, and all pressure seals, may be readily and accurately installed, or removed for inspection or replacement.

The valve body is formed with lateral tubular projections 4 and 5 in which the inlet port and outlet port respectively are located.

Within the body 1 is arranged an operating stem assembly comprising a stem 6 projecting outwardly of the valve body through a hole drilled in the flange 2, and a tubular stem mount 7 pressed into a bore in the valve body at the closed end, the stem mount being open at this end before being assembled in the valve body. The outer end of the stem is of considerably greater diameter than its inner end and the stem is formed with a collar 8 limiting its outward movement from the valve body. The inner end of the stem mount is accurately machined to a smaller diameter than an intermediate portion of the tubular mount and a hole is drilled through the inner end of the mount for the passage of the reduced diameter end of the stem. A compression spring 9 is arranged between the closed end of the mount and the collar 8 and is effective to normally hold the stem in outward position in which the parts of the valve may operate freely as a check valve. The inner end of the stem is crosscut as shown at 10 for a purpose later explained.

An accurately ground tube 11 is fitted within the valve body, one end being positioned on the reduced end of the stem mount 7, while the other end is positioned by an inwardly extending thickened portion 12 of the valve body located between the inlet and the outlet ports.

Ports 13 are provided in the wall of the tube for the main flow of fluid through the tube from the inlet port and out the open end of the tube when the valve members, later described, are in open position.

The valve members comprise a poppet valve 14 provided at one end with a circular projecting sealing ring 15 which is triangular in cross section and seats against the ground end face of tube 11 as indicated at 16. At its opposite end the poppet valve is reduced in diameter and provided with two concentric sealing rings, or triangular ridges 17 and 18, surrounding a central bore 19 extending axially through the poppet valve.

A pilot valve formed as a small circular plate 20 seats against ridges 17 and 18 and is held against them by a guiding and retaining member 21 formed as a cap sliding on the reduced end of the poppet valve and provided with a radially projecting flange. The inner end surface of cap 21 is formed with a hemispherical projection 22 bearing against the center of plate pilot valve 20, which is provided with a radiused edge so that the plate may tilt in the cap without danger of binding therein. The side wall of the cap is provided with openings 23 to provide a passage for fluid between port 5 and the central bore 19 of the poppet valve 14 when plate pilot valve 20 is cracked open.

A compression spring 24 is mounted between the radial flange projecting from cap 21 and a spring end locating member 25 bearing against end cap 3.

The main valve generally indicated at 26 is formed of two parts, 27, 31, the inner member 27 having a piston head 28 at one end closely fitting the accurately ground tube 11, which thus constitutes a cylinder, and a longitudinally extending tubular stem 29 which functions as an unseating member for plate valve 21. Poppet valve 14 is slidably mounted on stem 29. Holes 30 are provided in stem 29 for a purpose that will be explained later.

The second of the two main valve parts comprises a flow guiding member 31 slidably mounted on stem 29, with grooves 32 between fins 33 which fit within tube 11, and a solid ring 34 at the inner end which will shut off the passage of fluid between the tube and member 31 until ring 34 is moved outwardly toward port 5 beyond the end of tube 11.

The confronting faces of both the flow guide member and the poppet valve are bored to receive a light spring 35 urging the main valve to the left toward the closed position of the poppet valve, though the spring does not materially resist movement of the flow guide 31 to the right, as seen in Fig. 1, when the valve is functioning as a check valve, during which the inner part 27 of the valve is not moved.

It will be noted that tube 11 serves to prevent direct imposition of surge forces on the main valve.

An apertured tubular member 36 is arranged around the poppet valve 14, one end of the tube 36 bearing against the inner end of tube 11 while the outer end of tube 36 bears against end cap 3.

End cap 3 is thus effective to hold all the interior stationary parts in the housing in accurate relationship, and when removed, enables all working parts to be removed from the valve housing.

It will be understood that the usual O ring hydraulic sealing members 37 are positioned wherever necessary.

Figure 9:
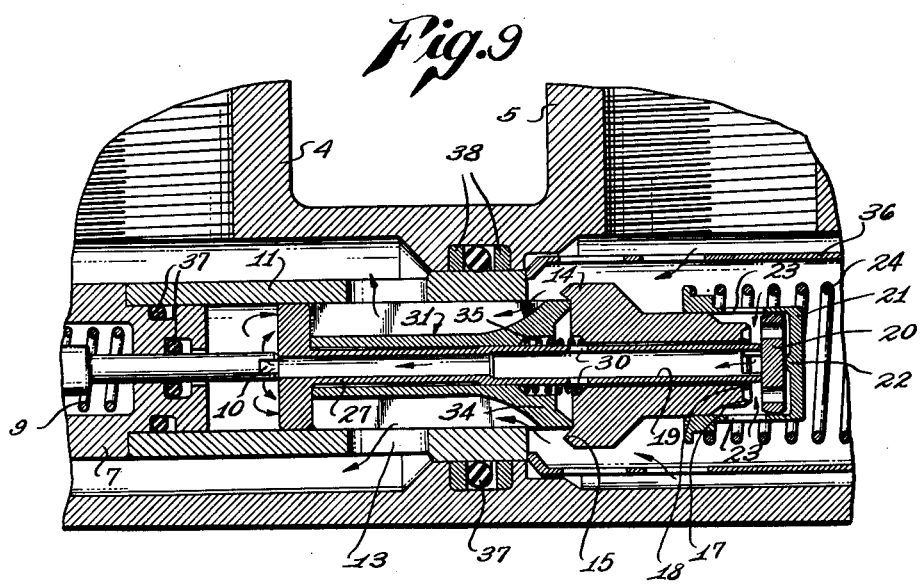
Fig. 9 is a section similar to that of Fig. 8 but showing the parts in the full open position of the valve.
Figure 10:
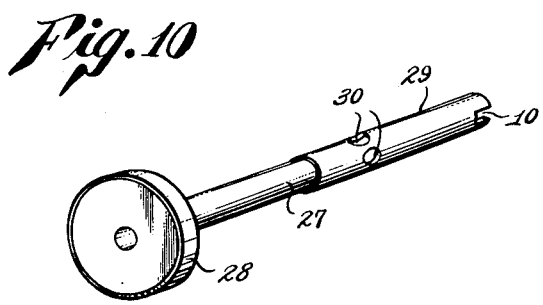
Fig. 10 is a perspective view of a piston like member of the main valve, having an elongated stem on which the flow guide shown in Fig. 7 is slidably mounted.

In certain locations it may be an advantage to provide leather back up rings 39 as indicated in Figs. 8 and 9 between the valve housing and tube 11 between the inlet and outlet ports.

It will be noted that the described construction provides a double seat around the main valve member, one cooperating with the head 34 of the flow member, the seat being opened by the projection of the head beyond the end of the tube 11, and closed whenever the lefthand edge, as seen in Fig. 8, enters the tube, while the second seat surrounds the first and is provided with the vertical face of the righthand end of the tube 11, which is preferably thickened outwardly adjacent this end. This double seal arrangement is very effective in preventing any leakage of the closed valve even after prolonged operation under the heavy hydraulic loads under which the valve is designed to operate.

When the stem 6 is pressed in against spring 9, it will push the piston head 28 to the right, as viewed in the drawings and cause the hollow stem 29 to unseat the plate valve 20. This valve serves as a pilot valve and can be rather easily unseated since there is very little surface area exposed to back pressure from the tubular projection or outlet port 5. Back pressure causes a flow of fluid past the pilot valve 20 and into the hollow stem 29. Fluid will flow through the apertures 30 in said stem to the space between the main valve member 31 and the poppet valve member 14. Fluid will also flow through the hollow stem portion 27 and the notch 10 in the stem 6 to produce pressure against the left face of the piston head 28. Thus the back pressure force will be exerted against both ends of the entire unit which includes the main valve member 31 and the poppet valve 14 so that they will be fully counterbalanced even though there is the spring 35 interposed between them. With the valve members 31 and 14 thus counterbalanced, it is a simple matter to further push the valve stem 6 to the right until the valve members are in the position of Fig. 9. This permits a back flow from the outlet port to the inlet port 4.

By reason of the counterbalancing operation it is possible to actuate the valve with a comparatively small degree of manual or other force as compared to back pressures which may exist in the outlet member 5 and in the valve chamber on the outlet side of the main valve.

It will be seen that the poppet valve 14 is opened by the movement of the outer or flow member 31 of the main valve, and that while operating as a check valve the flow member can slide back and forth on the inner member 27 of the main valve which can remain stationary with its head 28 resting against the inner end of stem 6.

While a preferred embodiment of the invention has been shown and described, it is not desired that the invention should be limited to any of the details of construction shown and described herein, except as defined in the appended claims.

What is claimed is:

1. In a valve having a housing provided with axially spaced inlet and outlet ports; a main flow passage extending axially of the housing between said ports and a control stem extending axially into said housing, a fully counterbalanced valve structure including stem extending into said housing, a main valve member slidable in and closely fitting said passage; and a poppet valve member mounted axially of the main valve and closing the outlet passage between the end of the passage and the outlet port, and constituting with said main valve a double closure for said passage in the closed position of the valve, the control stem being effective, in its opening movement, to first open said poppet valve and then the main valve; a passage communicating with said main passage and opposite sides of the main valve and poppet valve, and a pilot valve in said passage which, when open will counterbalance the pressure on the valve members during the opening of the main and poppet valves by the control stem.

2. In a valve having a housing provided with axially spaced inlet and outlet ports; a main flow passage extending axially of the housing between said ports and a control stem extending axially into said housing, a fully counterbalanced valve structure including stem extending into said housing, a main valve member slidable in and closely fitting said passage; and a poppet valve member mounted axially of the main valve and closing the outlet passage between the end of the passage and the outlet port, and constituting with said main valve a double closure for said passage in the closed position of the valve, the control stem being effective, in its opening movement, to first open said poppet valve and then the main valve; a passage for pressure fluid through the valve members, and a pilot valve, which, when operated at the commencement of the opening of the valve, will admit pressure fluid behind the main and poppet valve members to counterbalance the pressure acting thereon.

3. In a valve having a housing provided with axially spaced inlet and outlet ports; a main flow passage extending axially of the housing between said ports and a control stem extending axially into said housing, a fully counterbalanced valve structure including stem extending into said housing, a main valve member slidable in and closely fitting said passage; and a poppet valve member mounted axially of the main valve and closing the outlet passage between the end of the passage and the outlet port, and constituting with said main valve a double closure for said passage in the closed position of the valve, the control stem being effective, in its opening movement, to first open said poppet valve and then the main valve; a bypass passage extending through the main valve in alignment with a bypass passage extending through the poppet valve; a pilot valve mounted on the poppet valve and effective normally to seal said bypass passages; and parts operative during the opening of the valve by the operating stem to first open the pilot valve to admit pressure between said poppet valve and main valve, and also behind the main valve, to counterbalance the back pressure acting on the main and poppet valve members.

4. In a valve having a housing provided with axially spaced inlet and outlet ports; a main flow passage extending axially of the housing between said ports and a control stem extending axially into said housing, a fully counterbalanced valve structure including a cylindrical tube mounted between the valve ports, the tube being closed at one end but open toward the outlet port and having openings through its wall in communication with the inlet port, and with the outer surface of the tube in fluid tight relation with said housing between said openings and the outlet port; a piston valve mounted in said tube having an axial passage therethrough and having passages formed in its periphery; intermediate piston heads at each end of the piston valve; a poppet valve arranged for axial movement relative to said piston valve and effective to seal against a seat provided on the end of the cylindrical tube toward the outlet port in the closed position of the valve; a bypass passage and a pilot valve in the bypass passage and operated at the commencement of the opening of the valve to admit back pressure between the poppet valve and main valve and behind the main valve to counterbalance the pressure acting on the main and poppet valve members.

5. In a valve having a housing provided with axially spaced inlet and outlet ports; a passage extending axially of the housing between said ports and a control stem extending axially into said housing, a fully counter-balanced valve structure including a cylindrical tube mounted between the valve ports, the tube being closed at one end but open toward the outlet port and having openings through its wall in communication with the inlet port and having the outer surface of the tube in fluid tight relation with said housing between said openings and the outlet port; a two part piston valve mounted in said tube, an inner part of the valve having a head toward the closed end of the tube, and hollow stem extending axially through the open end of the tube, and an outer part mounted slidably upon said stem and having a head projectable beyond the open end of the tube in the open position of said valve; a poppet valve mounted slidably upon the projecting hollow stem of the main valve and engaged by, and moved to open position by the outer part of the main valve, and effective to seal against a seat provided on the end of the cylindrical tube toward the outlet port in the closed position of the valve; and a pilot valve operable at the commencement of the opening of the valve to admit back pressure between the poppet valve and main valve and behind the main valve to counterbalance the pressure acting on the main and poppet valve members.

6. In a valve having a housing provided with axially spaced inlet and outlet ports; a passage extending axially of the housing between said ports and a control stem extending axially into said housing, a fully counter-balanced valve structure including a cylindrical tube mounted between the valve ports, the tube being closed at one end but open toward the outlet port and having openings through its wall in communication with the inlet port and having the outer surface of the tube in fluid tight relation with said housing between said openings and the outlet port; a two part piston valve mounted in said tube, an inner part of the valve having a head toward the closed end of the tube, and hollow stem extending axially through the open end of the tube, and an outer part mounted slidably upon said stem and having a head projectable beyond the open end of the tube in the open position of said valve; a poppet valve mounted slidably upon the projecting hollow stem of the main valve and engaged by, and moved to open position by the outer part of the main valve, and effective to seal against a seat provided on the end of the cylindrical tube toward the outlet port in the closed position of the valve; and a pilot valve mounted axially on the poppet valve and opened by the projecting hollow stem of the main valve to admit pressure through said stem to the lower pressure side of the main valve, and openings therein, to the lower pressure side of the poppet valve, and between the head of the inner part of the main valve and the closed end of the tube; and resilient means urging the main valve, poppet valve and pilot valve toward closed position, the operating stem being effective, when operated to move the valve parts in opposition to the effort of the resilient means, whereby the valve operates as a check valve at times by the movement of the outer part of the main valve and poppet valve, and may be released against back pressure by inward pressure applied to the operating stem.

7. In a valve having a housing provided with axially spaced inlet and outlet ports; a passage extending axially of the housing between said ports and a control stem extending axially into said housing, a fully counter-balanced valve structure including a cylindrical tube mounted between the valve ports, the tube being closed at one end but open toward the outlet port and having openings through its wall in communication with the inlet port and having the outer surface of the tube in fluid tight relation with said housing between said openings and the outlet port; a two part piston valve mounted in said tube, an inner part of the valve having a head toward the closed end of the tube, and hollow stem extending axially through the open end of the tube, and an outer part mounted slidably upon said stem and having a head projectable beyond the open end of the tube in the open position of said valve; a poppet valve mounted slidably upon the projecting hollow stem of the main valve and engaged by, and moved to open position by the outer part of the main valve, and effective to seal against a seat provided on the end of the cylindrical tube toward the outlet port in the closed position of the valve; and a pilot valve mounted axially on the poppet valve and opened by the projecting hollow stem of the main valve to admit pressure through said stem to the lower pressure side of the main valve, and openings in the hollow stem, to the lower pressure side of the poppet valve, and between the head of the inner part of the main valve and the closed end of the tube; resilient means arranged between the poppet valve and the head of the outer part of the main valve; and resilient means urging the main valve, poppet valve and pilot valve toward closed position, the operating stem being effective, when operated to move the valve parts in opposition to the effort of the resilient means, whereby the valve operates as a check valve at times by the movement of the outer part of the main valve and poppet valve, and may be released against back pressure by inward pressure applied to the operating stem.

H. DEXTER McKAY.
*Executor of the estate of Alex Bertea, deceased.*

References Cited in the file of this patent

UNITED STATES PATENTS

| Number | Name | Date |
|---|---|---|
| 1,215,146 | Haeseler | Feb. 6, 1917 |
| 1,998,913 | Wheaton | Apr. 23, 1935 |
| 2,355,692 | Allen | Aug. 15, 1944 |
| 2,426,065 | Stevens | Apr. 19, 1947 |
| 2,460,196 | Simpson | Jan. 25, 1949 |

FOREIGN PATENTS

| Number | Country | Date |
|---|---|---|
| 420,663 | Germany | of 1925 |